US011934626B2

United States Patent
Lai et al.

(10) Patent No.: US 11,934,626 B2
(45) Date of Patent: Mar. 19, 2024

(54) JOYSTICK WITH PREFERRED RECOVERING FUNCTION

(71) Applicant: PixArt Imaging Inc., Hsin-Chu (TW)

(72) Inventors: Hung-Yu Lai, Hsin-Chu (TW); Yong-Nong Huang, Hsin-Chu (TW); Hui-Hsuan Chen, Hsin-Chu (TW); Jia-Hong Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/844,058

(22) Filed: Jun. 20, 2022

(65) Prior Publication Data

US 2023/0103383 A1    Apr. 6, 2023

Related U.S. Application Data

(60) Provisional application No. 63/272,663, filed on Oct. 27, 2021, provisional application No. 63/248,548, filed on Sep. 27, 2021.

(51) Int. Cl.
  *G06F 3/04815*   (2022.01)
  *G06T 19/00*     (2011.01)
(52) U.S. Cl.
  CPC ........ *G06F 3/04815* (2013.01); *G06T 19/006* (2013.01)
(58) Field of Classification Search
  CPC ............ G05G 9/047; G05G 5/05; G05G 2009/04718; G05G 2009/04733; G06F 3/0338; G06F 3/04815; A63F 13/24; G06T 19/006
  See application file for complete search history.

(56) References Cited

U.S. PATENT DOCUMENTS

| | | | | |
|---|---|---|---|---|
| 6,064,369 | A * | 5/2000 | Okabe | G05G 5/06 |
| | | | | 345/161 |
| 2002/0005833 | A1 * | 1/2002 | Furukawa | G05G 9/047 |
| | | | | 345/161 |
| 2004/0095320 | A1 * | 5/2004 | Furukawa | G05G 9/047 |
| | | | | 345/161 |
| 2009/0295724 | A1 * | 12/2009 | Cheng | G05G 9/047 |
| | | | | 345/161 |

(Continued)

FOREIGN PATENT DOCUMENTS

WO   WO-2023062887 A1 *  4/2023

*Primary Examiner* — Temesghen Ghebretinsae
*Assistant Examiner* — Karin Kiyabu
(74) *Attorney, Agent, or Firm* — Winston Hsu

(57) ABSTRACT

A joystick includes a stick head, an actuating component, a substrate, a bearing base, a resilient recovering component and a constraining component. The actuating component has a first end and a second end opposite to each other. The first end is connected to the stick head, and an identification feature is disposed on the second end. The substrate has a detection module used to detect the identification feature and determine motion of the stick head. The bearing base is disposed on the substrate. An opening portion of the bearing base aligns with the detection module and the actuating component. The resilient recovering component is disposed between the substrate and the bearing base. The constraining component is disposed on the resilient recovering component and movably disposed inside the opening portion, and used to abut against the actuating component in a detachable manner.

9 Claims, 17 Drawing Sheets

FIG. 9

(56) References Cited

U.S. PATENT DOCUMENTS

2012/0274563 A1* 11/2012 Olsson .................. G05G 9/047
                                                              345/161
2020/0340676 A1* 10/2020 Ha .......................... F24C 3/103

* cited by examiner

JOYSTICK WITH PREFERRED RECOVERING FUNCTION

CROSS REFERENCE TO RELATED APPLICATIONS

This application claims the benefit of U.S. Provisional Application No. 63/248,548, filed on Sep. 27, 2021. Further, this application claims the benefit of U.S. Provisional Application No. 63/272,663, filed on Oct. 27, 2021. The contents of these applications are incorporated herein by reference.

BACKGROUND OF THE INVENTION

1. Field of the Invention

The present invention relates to a joystick, and more particularly, to a joystick with preferred recovering function.

2. Description of the Prior Art

A conventional optical joystick includes a sensor, a lever arm, a recovering component and a handle. The user presses the handle to move the lever arm, and the sensor detects motion of identification features on the lever arm to control a cursor signal output by the optical joystick. When the optical joystick is reclined, the lever arm is rotated or slanted towards specially designated directions, and the recovering component is compressed to store a resilient recovering force; when the pressure applied to the handle is removed, the resilient recovering force of the recovering component moves the lever arm back to an initial mode. Two opposite ends of the recovering component respectively contact against the lever arm and a substrate of the optical joystick. However, the optical joystick needs accurate recovering motion of the lever arm, but the two opposite ends of the recovering component may be non-parallel due to long-term usage and incorrect installation, and therefore the recovering component of the conventional optical joystick cannot be recovered to an inaccurate position. Therefore, the conventional optical joystick is operated by limited gestures, and the conventional recovering function of the recovering component cannot accurately recover the lever arm back to the predefined initial mode, so the conventional optical joystick does not have preferred detection accuracy.

SUMMARY OF THE INVENTION

The present invention provides a joystick with preferred recovering function for solving above drawbacks.

According to the claimed invention, a joystick includes a stick head, an actuating component, a substrate, a bearing base, a resilient recovering component and a constraining component. The actuating component has a first end and a second end opposite to each other. The first end is connected to the stick head, and an identification feature is disposed on the second end. The substrate has a detection module used to detect the identification feature and determine motion of the stick head. The bearing base is disposed on the substrate. An opening portion of the bearing base aligns with the detection module and the actuating component. The resilient recovering component is disposed between the substrate and the bearing base. The constraining component is disposed on the resilient recovering component and movably disposed inside the opening portion, and used to abut against the actuating component in a detachable manner.

According to the claimed invention, the opening portion is a straight channel, the constraining component is slid inside the straight channel to constrain a moving direction of the constraining component. The bearing base includes a first constraining portion, and the constraining component includes a second constraining portion movably assembled with the first constraining portion. The first constraining portion and the second constraining portion respectively are a slot and a slide block, the slide block is moved along a slotted direction of the slot to constrain a moving direction of the constraining component.

According to the claimed invention, the joystick further includes a first rotation component and a second rotation component. The first rotation component is movably disposed on the bearing base and rotatable in a first direction. The second rotation component is movably connected to the first rotation component and rotatable in a second direction different from the first direction. The actuating component is disposed on the second rotation component in a rotatable manner. The actuating component abuts against the constraining component via the second rotation component in a detachable manner. An outer surface of the second rotation component is slid relative to an inner surface of the first rotation component in a detachable manner.

According to the claimed invention, the actuating component includes an abutting portion abutting against a surface of the second rotation component. The joystick further includes a fixing component engaged with the actuating component and abutting against the other surface of the second rotation component, so as to prevent the actuating component and the second rotation component from separation. The joystick further includes a covering component disposed on the substrate and used to cover the actuating component and the bearing base. The first end of the actuating component pierces through a hole portion of the covering component and is connected with the stick head. An outer surface of the first rotation component is slid relative to an inner surface of the covering component in a detachable manner.

According to the claimed invention, a joystick includes a stick head, an actuating component, a substrate, a bearing base, a resilient recovering component, a first rotation component and a second rotation component. The actuating component has a first end and a second end opposite to each other. The first end is connected to the stick head, and an identification feature is disposed on the second end. The substrate has a detection module used to detect the identification feature and determine motion of the stick head. The bearing base is disposed on the substrate, and an opening portion of the bearing base aligns with the detection module and the actuating component. The resilient recovering component is disposed between the substrate and the bearing base. The first rotation component is movably disposed on the bearing base and rotatable in a first direction. The second rotation component is movably connected to the first rotation component and rotatable in a second direction different from the first direction and connected to the actuating component in a rotatable manner.

The joystick in the first embodiment can utilize assembly of the actuating component and the second rotation component to provide revolving movement, and further utilize pivots between the first rotation component and the second rotation component and pivots between the first rotation component and the bearing base to provide slanting movement. The joystick in the second embodiment can dispose the constraining component inside the bearing base; the constraining component can be moved downwardly with lowering motion of the second rotation component to compress the resilient recovering component, and the resilient recovering component can push the constraining component relative to the bearing base for recovering of the second rotation component and the stick head and the actuating component. The second embodiment can effectively achieve a stably recovering demand of the resilient recovering component via constraint of the constraining component and the bearing base, so that the joystick can have preferred detection accuracy. The joystick in the third embodiment can cover the sheathing component by the first supporting portion and the second supporting portion of the supporting component, and the sheathing component can be freely rotated or moved or slanted within the supporting component; the actuating component can be revolved via the sheathing component, and further can be operated as a universal joint by concentric assembly of the sheathing component and the supporting component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
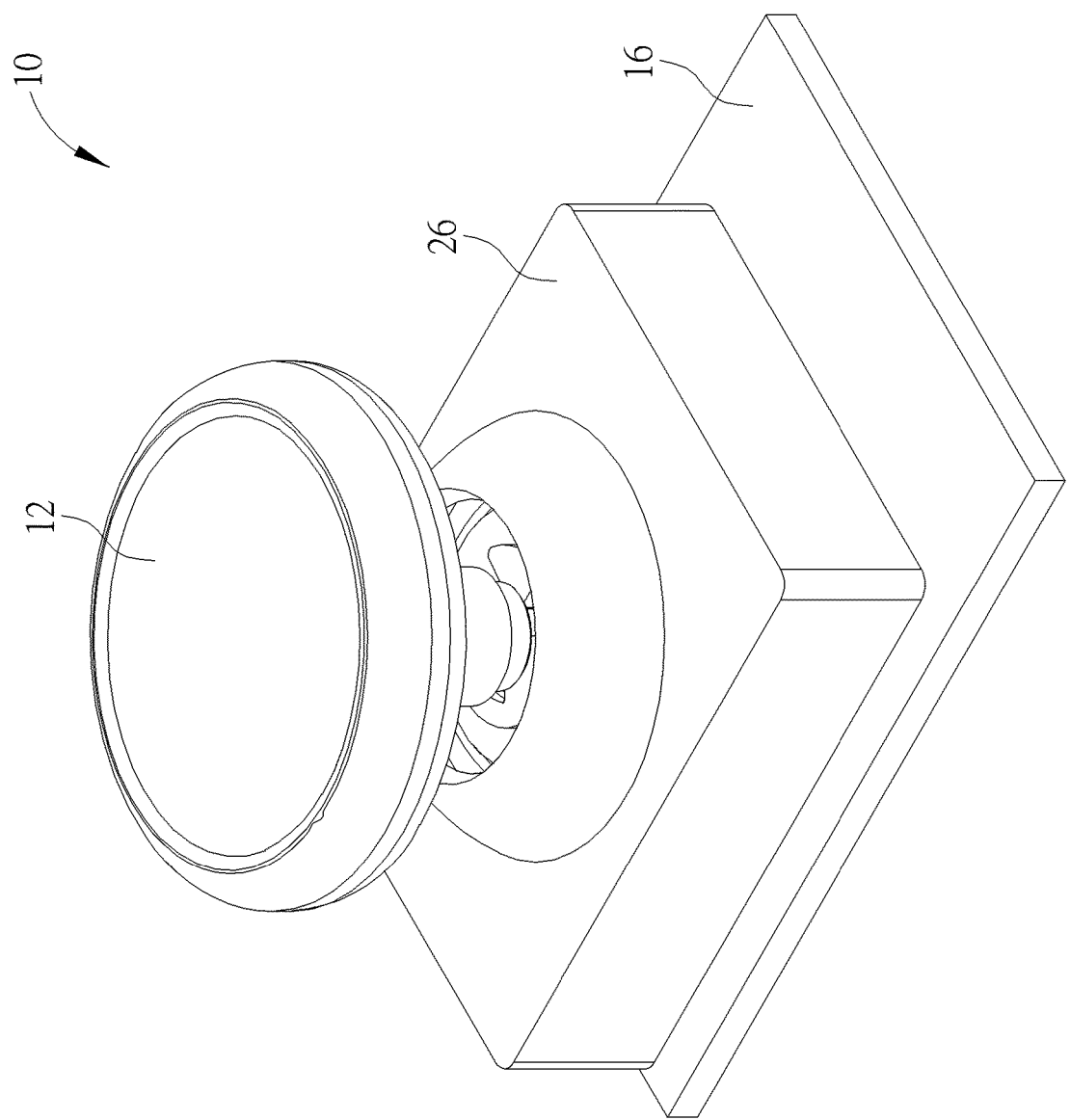
FIG. 1 and FIG. 2 are diagrams of a joystick in different views according to a first embodiment of the present invention.
Figure 2:
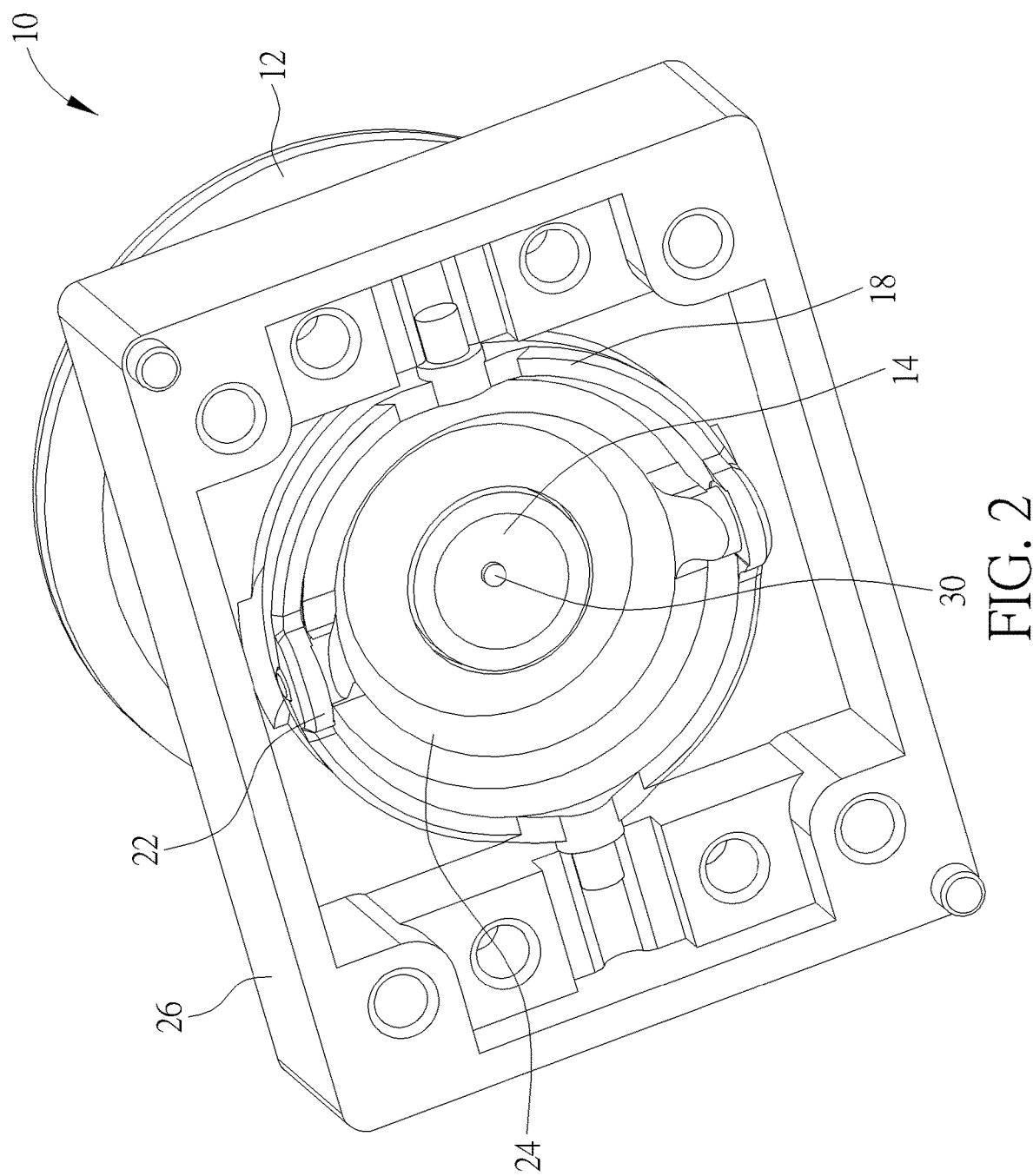
Figure 3:
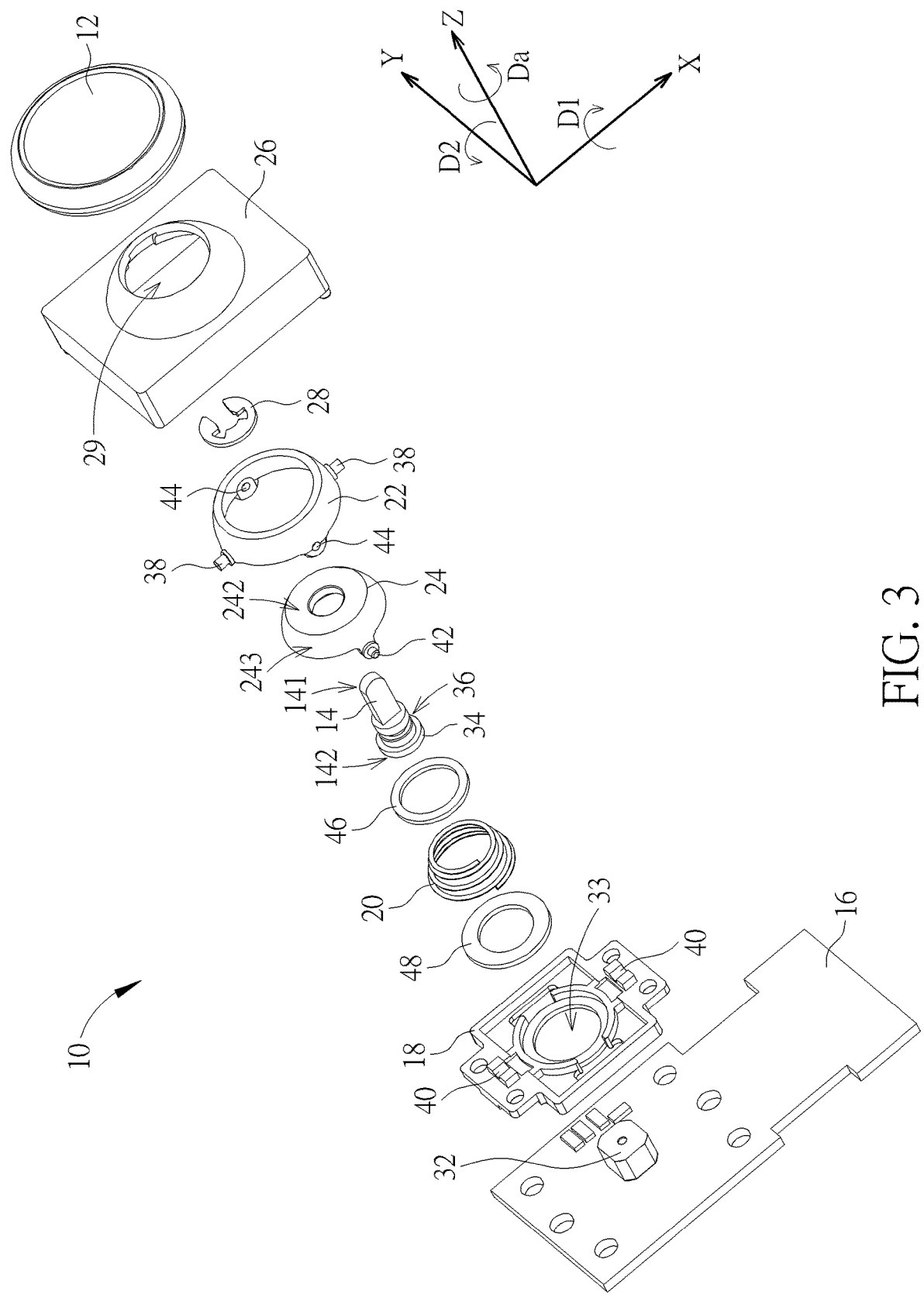
FIG. 3 is an exploded diagram of the joystick according to the first embodiment of the present invention.
Figure 4:
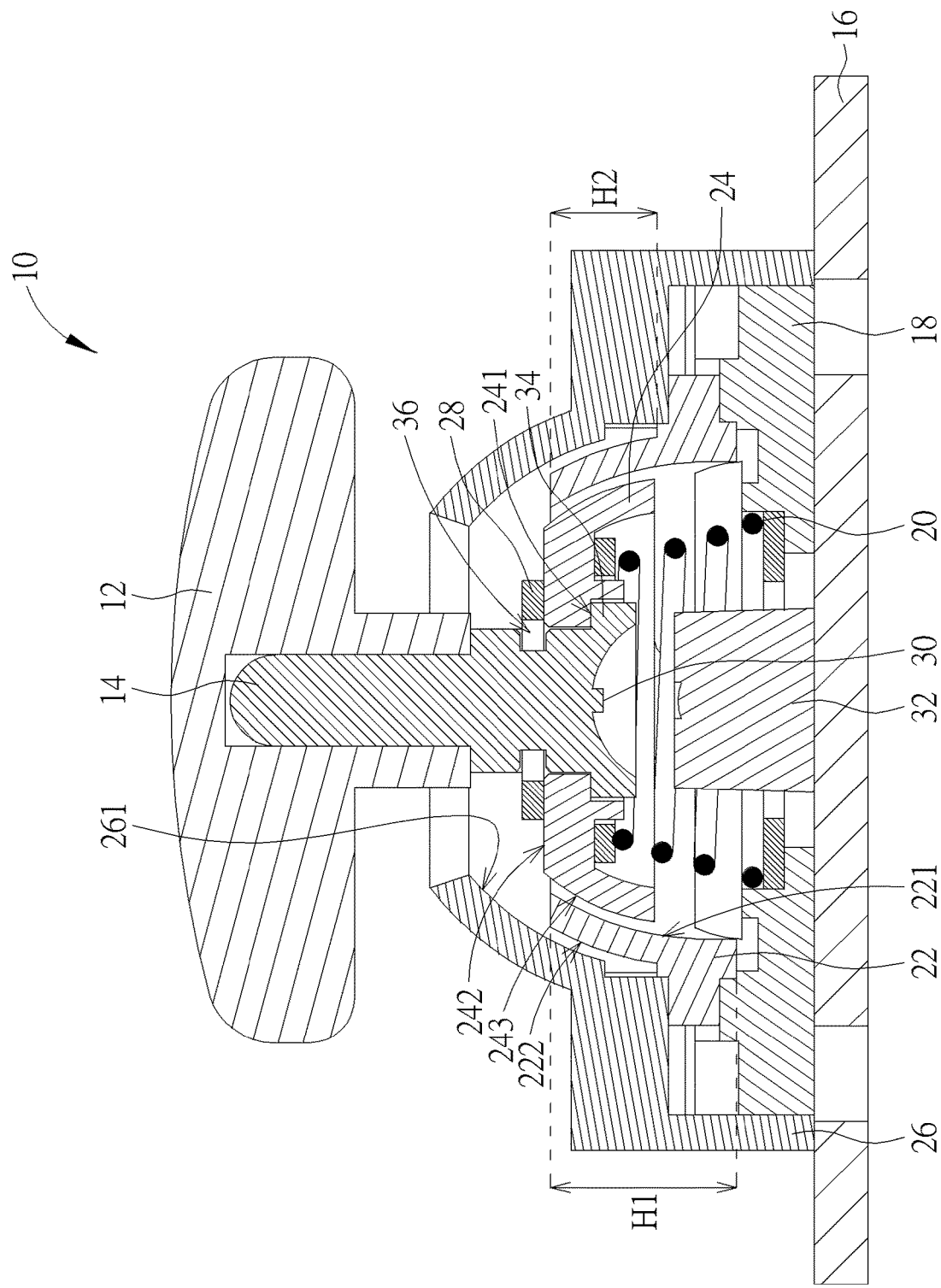
FIG. 4 is a sectional view of the joystick according to the first embodiment of the present invention.

Please refer to FIG. 1 to FIG. 4. FIG. 1 and FIG. 2 are diagrams of a joystick 10 in different views according to a first embodiment of the present invention. FIG. 3 is an exploded diagram of the joystick 10 according to the first embodiment of the present invention. FIG. 4 is a sectional view of the joystick 10 according to the first embodiment of the present invention. The joystick 10 can include a stick head 12, an actuating component 14, a substrate 16, a bearing base 18, a resilient recovering component 20, a first rotation component 22, a second rotation component 24 and a covering component 26. The stick head 12 can be an operation interface of the joystick 10. The user can push, pull and rotate the stick head 12 to control the joystick 10 to output a corresponding control command. The actuating component 14 can be assembled with the first rotation component 22 and the second rotation component 24 in a movable manner. The actuating component 14, the first rotation component 22 and the second rotation component 24 can be disposed on the bearing base 18 and then installed on the substrate 16. The resilient recovering component 20 can be disposed inside the bearing base 18. Two opposite ends of the resilient recovering component 20 can respectively contact against the substrate 16 (or the bearing base 18) and the second rotation component 24. The covering component 26 can be disposed on the substrate 16 to cover the actuating component 14 and the bearing base 18.

The actuating component 14 can pierce through a hollow hole formed on the second rotation component 24, and be disposed on the second rotation component 24 via the fixing component 28. The actuating component 14 which is assembled with the second rotation component 24 can pierce through a hollow hole formed on the first rotation component 22 and be connected with the stick head 12. The actuating component 14 can have a first end 141 and a second end 142 opposite to each other. The first end 141 can pierce through the hollow holes on the first rotation component 22 and the second rotation component 24, and further pierce through a buttonhole 29 formed on the covering component 26 to connect with the stick head 12. The second end 142 can have an identification feature 30, and can be stuck with the resilient recovering component 20 to point the substrate 16. The substrate 16 can have a detection module 32. An opening portion 33 of the bearing base 18 can align with the detection module 32 and the second end 142 of the actuating component 14. An optical detection signal emitted by a light source (which is not marked in the figures) can be projected onto the identification feature 30 of the actuating component 14. The detection module 32 can receive an optical signal from the identification feature 30 through the opening portion 33, and analyze the optical signal to acquire a behavior of the identification feature 30 and decide motion of the stick head 12. The light source may be disposed adjacent to the detection module 32, or adjacent to the identification feature 30, or any position that can illuminate the identification feature 30; or the identification feature 30 can have an illumination function.

The actuating component 14 can include an abutting portion 34 disposed on the second end 142 and contact against an inner surface 241 of the second rotation component 24. The fixing component 28 can be engaged with an engaging slot 36 of the actuating component 14, and contact against a top surface 242 of the second rotation component 24. The actuating component 14 can be fixed on the two opposite surfaces of the second rotation component 24 via the abutting portion 34 and the fixing component 28, so as to prevent the actuating component 14 from being separated from the second rotation component 24. Therefore, the actuating component 14 can be revolved relative to the second rotation component 24 in a revolving axial direction Da via assembly of the abutting portion 34 and the fixing component 28.

The first rotation component 22 can include a first bearing portion 38 movably disposed inside a first slotted portion 40 of the bearing base 18. The first rotation component 22 can be movably assembled with the bearing base 18, and further be rotated in a first direction D1 via assembly of the first bearing portion 38 and the first slotted portion 40. The first rotation component 22 can have structural features replaced by structural features of the bearing base 18; for example, the first rotation component 22 may have the first slotted portion and accordingly the bearing base 18 may have the first bearing portion. In addition, the second rotation component 24 can include a second bearing portion 42 movably disposed on a second slotted portion 44 of the first rotation component 22. The second rotation component 24 can be movably connected with the first rotation component 22, and further can be rotated in a second direction D2 different from the first direction D1 via assembly of the second bearing portion 42 and the second slotted portion 44. The structural features of the first bearing portion 38 and the first slotted portion 40, and the structural features of the second bearing portion 42 and the second slotted portion 44 are not limited to the embodiments shown in FIG. 1, and depend on a design demand.

The resilient recovering component 20 can be disposed between the bearing base 18 and the substrate 16. A structural height H1 of the first rotation component 22 can be greater than a structural height H2 of the second rotation component 24, so that the second rotation component 24 can be movably accommodated inside the first rotation component 22. The second rotation component 24 can be held by the resilient recovering component 20 and suspended above the substrate 16. The resilient recovering component 20 can be deformed when the second rotation component 24 is rotated relative to the first rotation component 22. The joystick 10 can further include a first spacer 46 and a second spacer 48. The first spacer 46 can be disposed between the second rotation component 24 and a top of the resilient recovering component 20. The second spacer 48 can be disposed between the substrate 16 (or the bearing base 18) and a bottom of the resilient recovering component 20. If the stick head 12 is pressed downwardly, the resilient recovering component 20 can be compressed to store a resilient recovering force. If pressure applied on the stick head 12 is weakened or removed, the resilient recovering force of the resilient recovering component 20 can push the stick head 12 back to an initial position via the actuating component 14 and the first rotation component 22.

Figure 5:
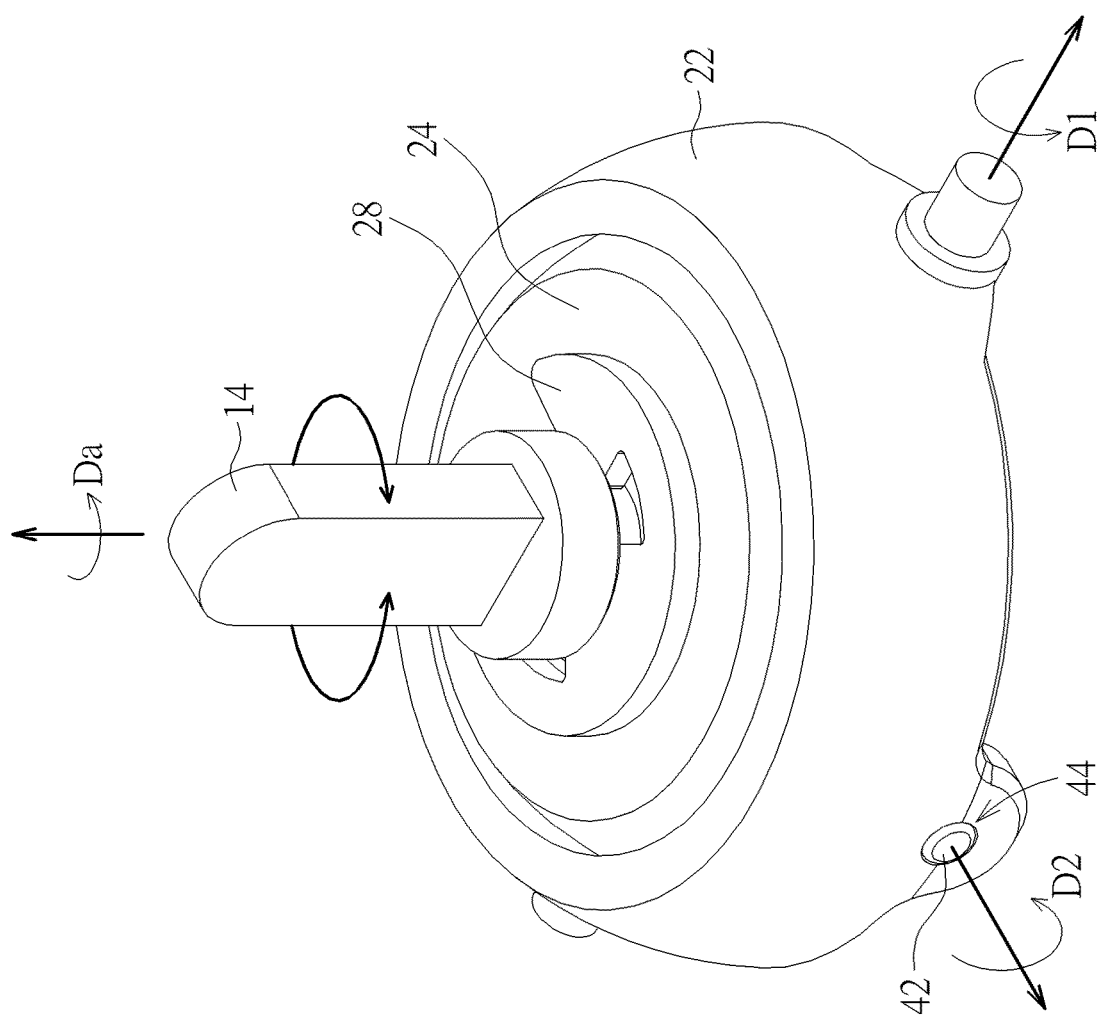
FIG. 5 is an assembly diagram of an actuating component, a first rotation component and a second rotation component according to the first embodiment of the present invention.

In the first embodiment, the actuating component 14 can abut against the resilient recovering component 20 via the second rotation component 24 in a detachable manner, or the top of the resilient recovering component 20 can be assembled with or abut against the second rotation component 24 through the first spacer 46. The actuating component 14 and the second rotation component 24 can be pressed downwardly and recovered simultaneously via the resilient recovering component 20. Besides, an outer surface 243 of the second rotation component 24 can be slid relative to an inner surface 221 of the first rotation component 22 in the detachable manner, and an outer surface 222 of the first rotation component 22 can be slid relative to an inner surface 261 of the covering component 26 in the detachable manner. Please refer to FIG. 5. FIG. 5 is an assembly diagram of the actuating component 14, the first rotation component 22 and the second rotation component 24 according to the first embodiment of the present invention. The joystick 10 can utilize motion of the actuating component 14 relative to the second rotation component 24 to provide activity of the actuating component 14 in the revolving axial direction Da, and utilize motion of the first rotation component 22 and the second rotation component 24 relative to the bearing base 18 to provide activity of the actuating component 14 in the first direction D1 and the second direction D2.

Figure 6:
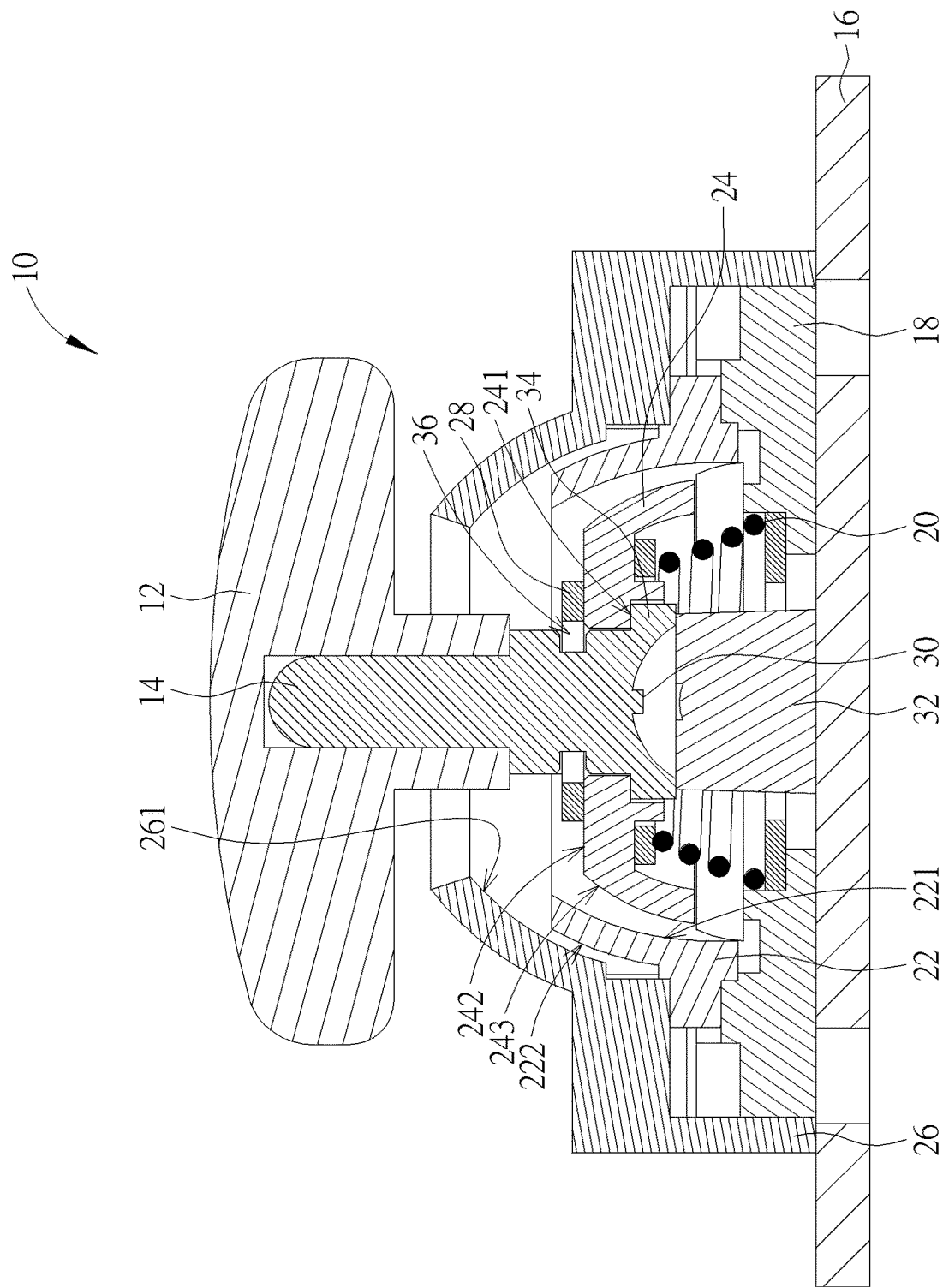
FIG. 6 to FIG. 8 are sectional views of the joystick in other operation modes according to the first embodiment of the present invention.
Figure 7:
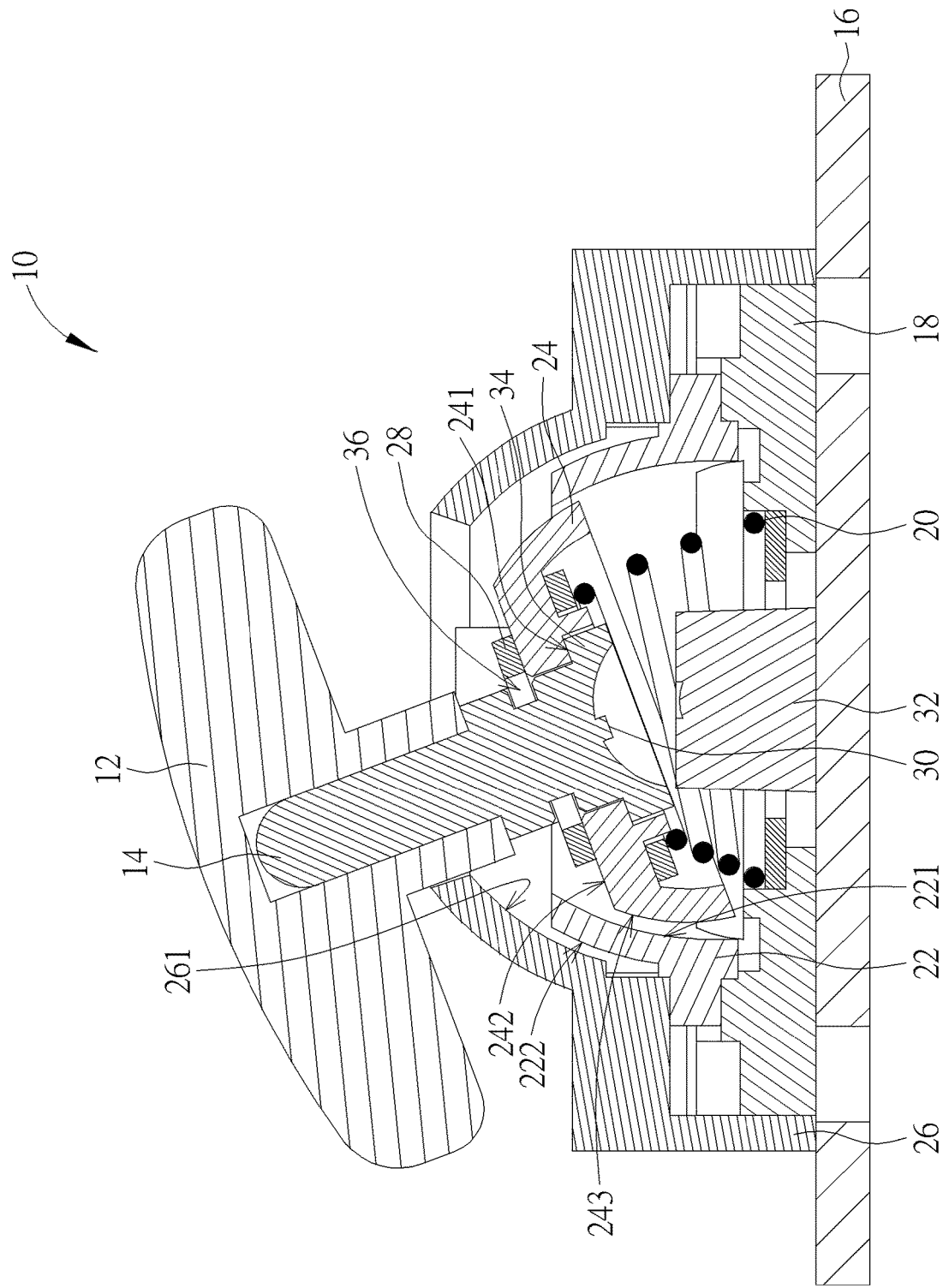
Figure 8:
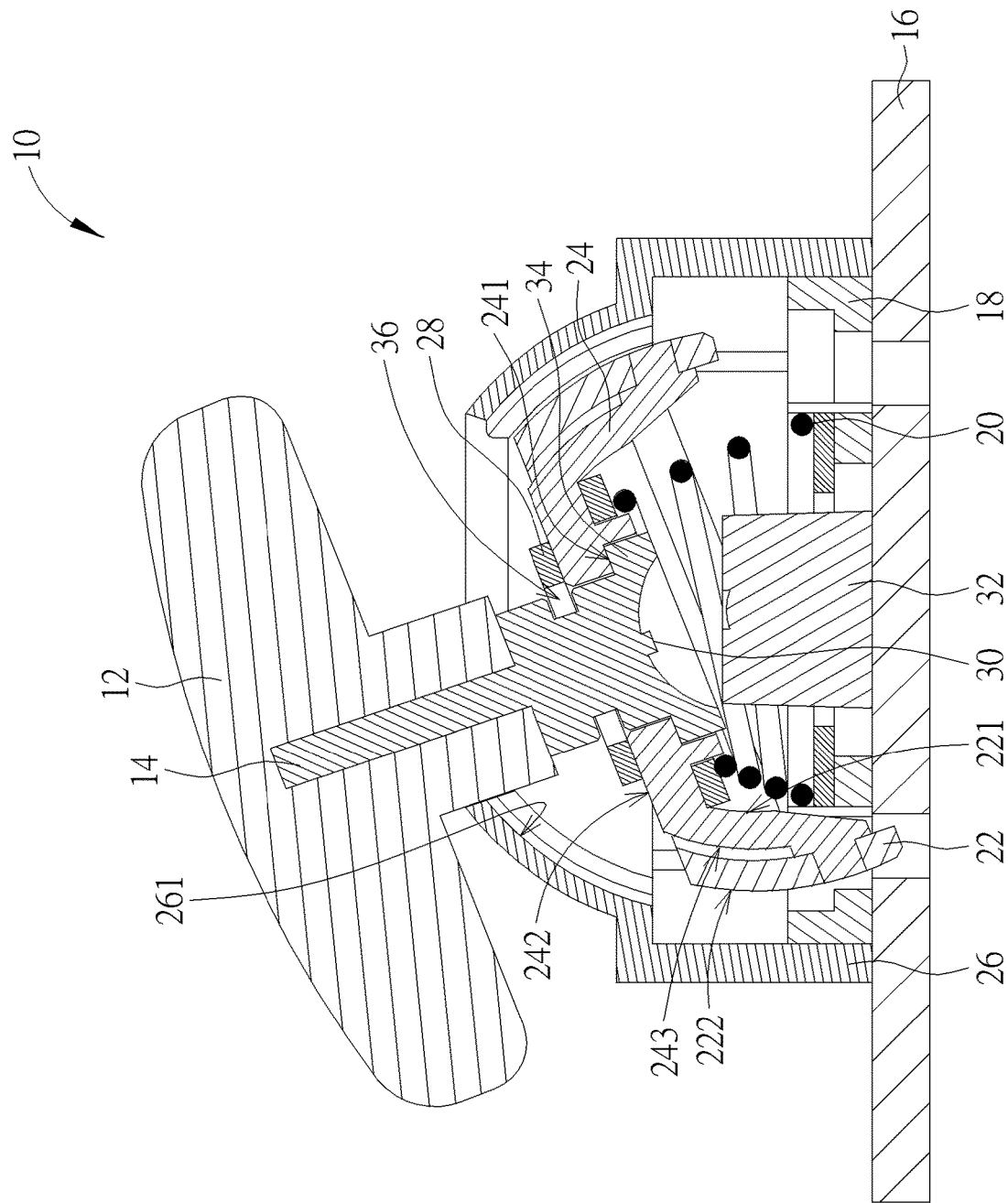

Please refer to FIG. 3, FIG. 4, and FIG. 6 to FIG. 8. FIG. 6 to FIG. 8 are sectional views of the joystick 10 in other operation modes according to the first embodiment of the present invention. As shown in FIG. 4, the joystick 10 is in the initial mode, so the resilient recovering component 20 is not compressed, and the first rotation component 22 is not rotated relative to the bearing base 18 and the second rotation component 24 is not rotated relative to the first rotation component 22; meanwhile, the actuating component 14 can be optionally revolved relative to the second rotation component 24, and the detection module 32 can detect the behavior of the identification feature 30 to decide the revolving angle of the joystick 10. As shown in FIG. 7 and FIG. 8, the stick head 12 is pushed laterally, so that the actuating component 14 and the second rotation component 24 can be rotated relative to the first rotation component 22 in the second direction D2, or the actuating component 14 and the first rotation component 22 and the second rotation component 24 can be rotated relative to the bearing base 18 in the first direction D1, and the detection module 32 can detect the behavior of the identification feature 30 to decide a slanting direction and a slanting angle of the joystick 10.

Figure 9:
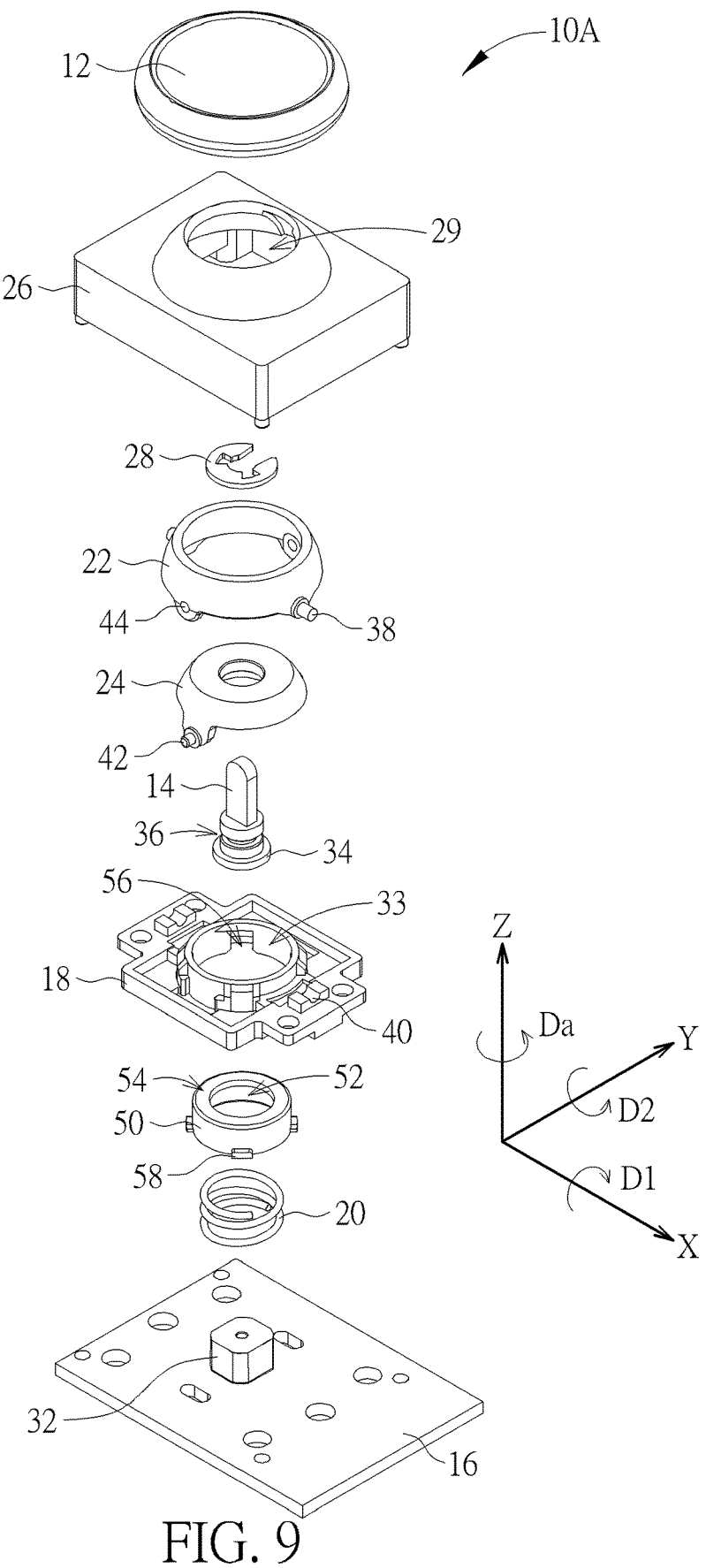
FIG. 9 is an exploded diagram of the joystick according to a second embodiment of the present invention.
Figure 10:
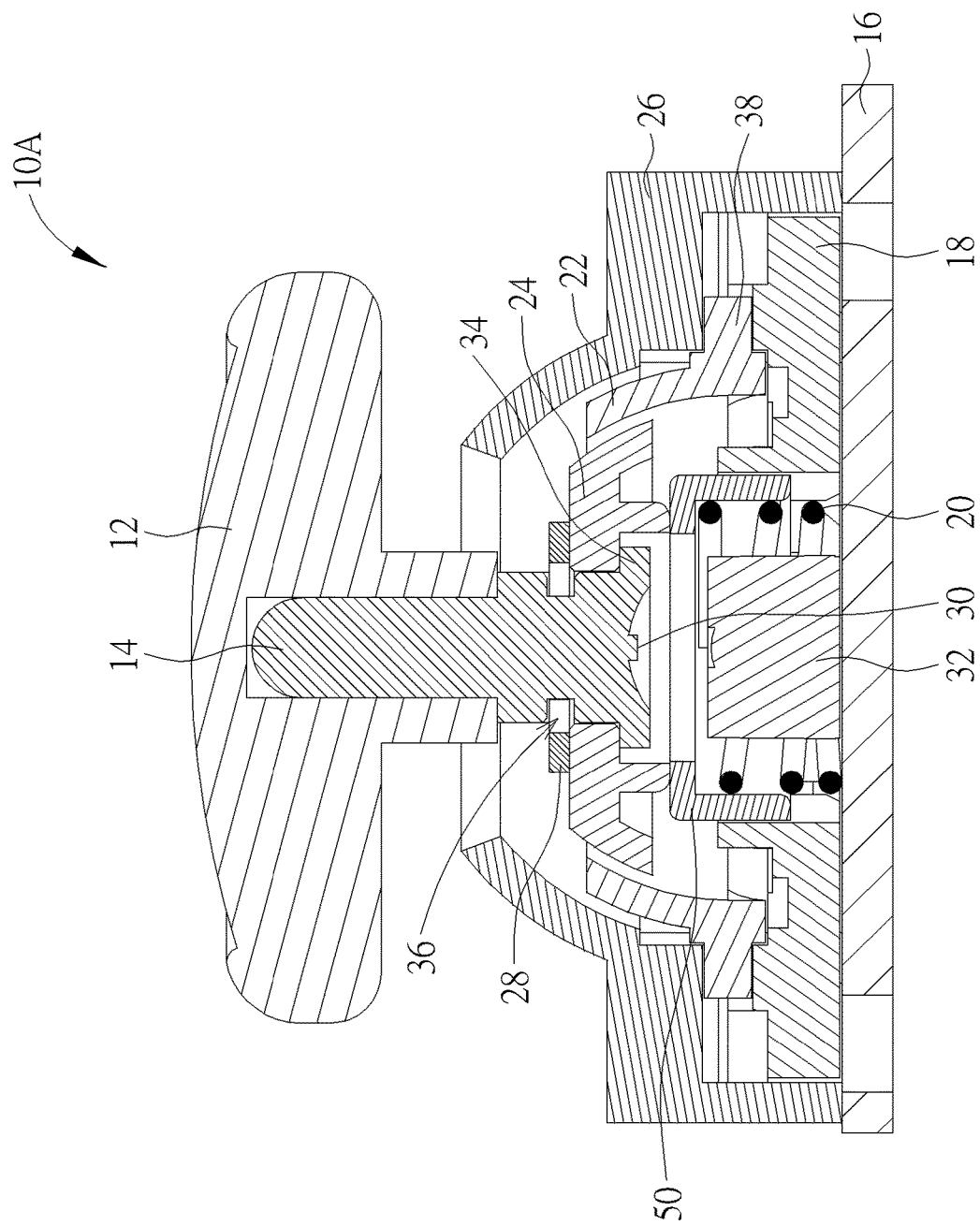
FIG. 10 is a sectional view of the joystick according to the second embodiment of the present invention.

Please refer to FIG. 9 and FIG. 10. FIG. 9 is an exploded diagram of the joystick 10A according to a second embodiment of the present invention. FIG. 10 is a sectional view of the joystick 10A according to the second embodiment of the present invention. In the second embodiment, elements having the same numerals as ones of the first embodiment have the same structures and functions, and a detailed description is omitted herein for simplicity. The joystick 10A can include the stick head 12, the actuating component 14, the substrate 16, the bearing base 18, the resilient recovering component 20, the first rotation component 22, the second rotation component 24, the covering component 26 and a constraining component 50. Two opposite ends of the resilient recovering component 20 can respectively contact against the substrate 16 (or the bearing base 18) and an inner surface of the constraining component 50. The constraining component 50 can be a hollow structure covering the resilient recovering component 20. The constraining component 50 can be movably disposed inside the opening portion 33 of the bearing base 18. The constraining component 50 may further include a plurality of side walls or pillars disposed around the resilient recovering component 20. The constraining component 50 can have an opening portion 52. The detection module 32 can detect the identification features 30 through the opening portion 52 of the constraining component 50 and the opening portion 33 of the bearing base 18. The detection module 32 can further receive the optical signal from the identification feature 30, and analyze the optical signal to acquire the behavior of the identification feature 30 and decide the motion of the stick head 12.

The constraining component 50 can further include a top portion 54 disposed around the opening portion 52. The actuating component 14 (or the second rotation component 24 assembled with the actuating component 14) can abut against the top portion 54 of the constraining component 50 in the detachable manner. When the stick head 12 is pushed laterally, a part of the actuating component 14 (or the second rotation component 24) can abut against the top portion 54 of the constraining component 50, and other part of the actuating component 14 (or the second rotation component 24) can be separated from the top portion 54 of the constraining component 50. Moreover, the opening portion 33 of the bearing base 18 can be optionally designed as a straight channel. An inner diameter of the opening portion 33 can be greater than or the same as an outer diameter of the constraining component 50. When the stick head 12 is pressed, the constraining component 50 can be slid along the opening portion 33 designed as the straight channel, and therefore a moving direction of the constraining component 50 can be limited accordingly.

The bearing base 18 can optionally include a first constraining portion 56, and the constraining component 50 can optionally include a second constraining portion 58. The second constraining portion 58 can be fit with the first constraining portion 56 in a movable manner. The resilient recovering force of the resilient recovering component 20 can push the stick head 12 and the actuating component 14 upwardly via the constraining component 50, and the constraining component 50 can be stopped when the second constraining portion 58 abuts against the top of the first constraining portion 56. A recovering function of the pressed joystick 10A can be limited by relative slide between the first constraining portion 56 and the second constraining portion 58, and the stick head 12 can be stably recovered to the initial angle and the initial position. In the second embodiment, the first constraining portion 56 and the second constraining portion 58 can respectively be a slot and a slide block. The slide block can be slid along a slotted direction of the slot to constrain the moving direction of the constraining component 50. Structures of the first constraining portion 56 and the second constraining portion 58 are not limited to the above-mentioned embodiment. For example, the first constraining portion 56 may be the slide block and the second constraining portion 58 may be the slot, or the first constraining portion 56 and the second constraining portion 58 can be designed as any cooperated structures capable of limiting the sliding direction.

Figure 11:
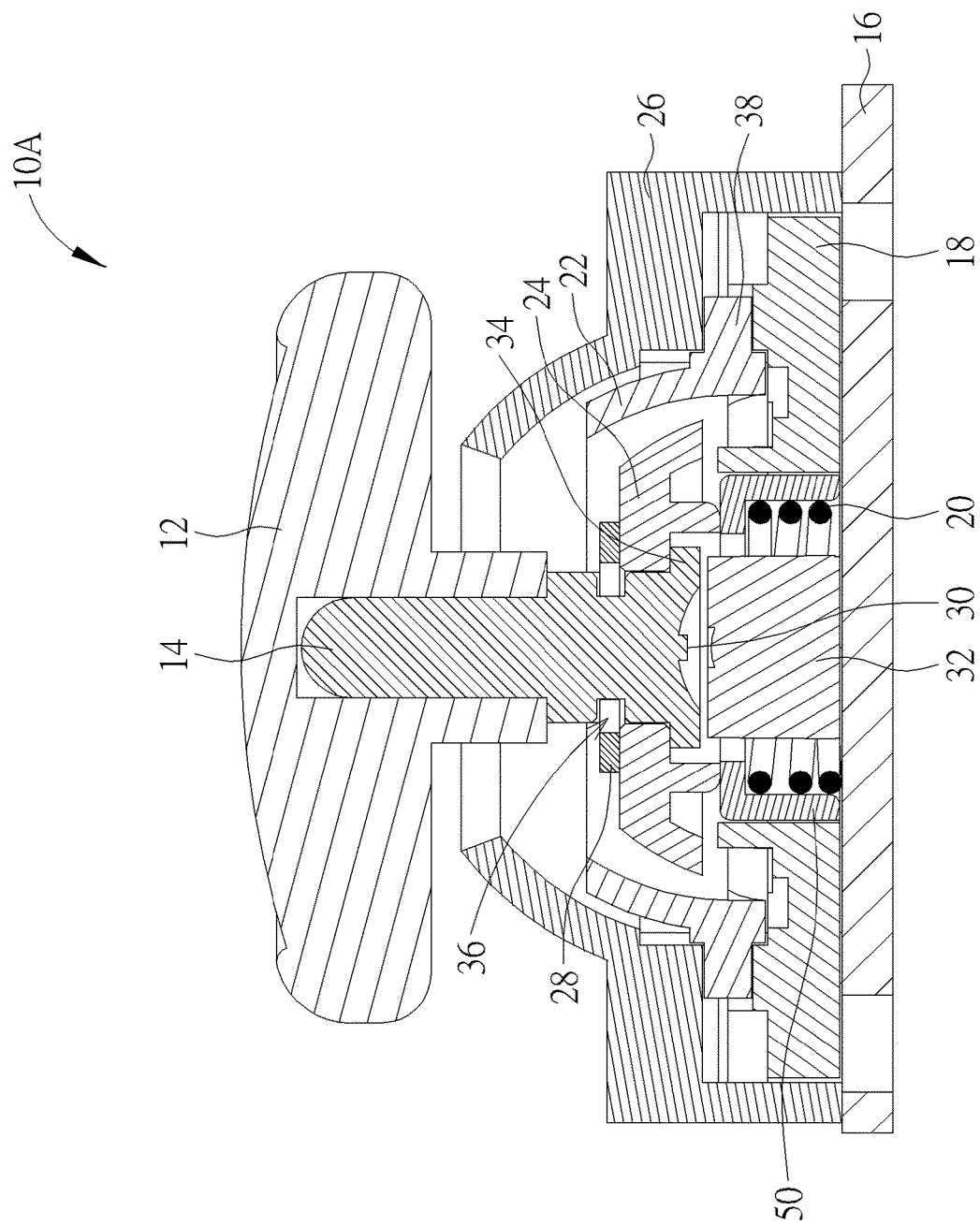
FIG. 11 and FIG. 12 are sectional views of the joystick in other operation modes according to the second embodiment of the present invention.
Figure 12:
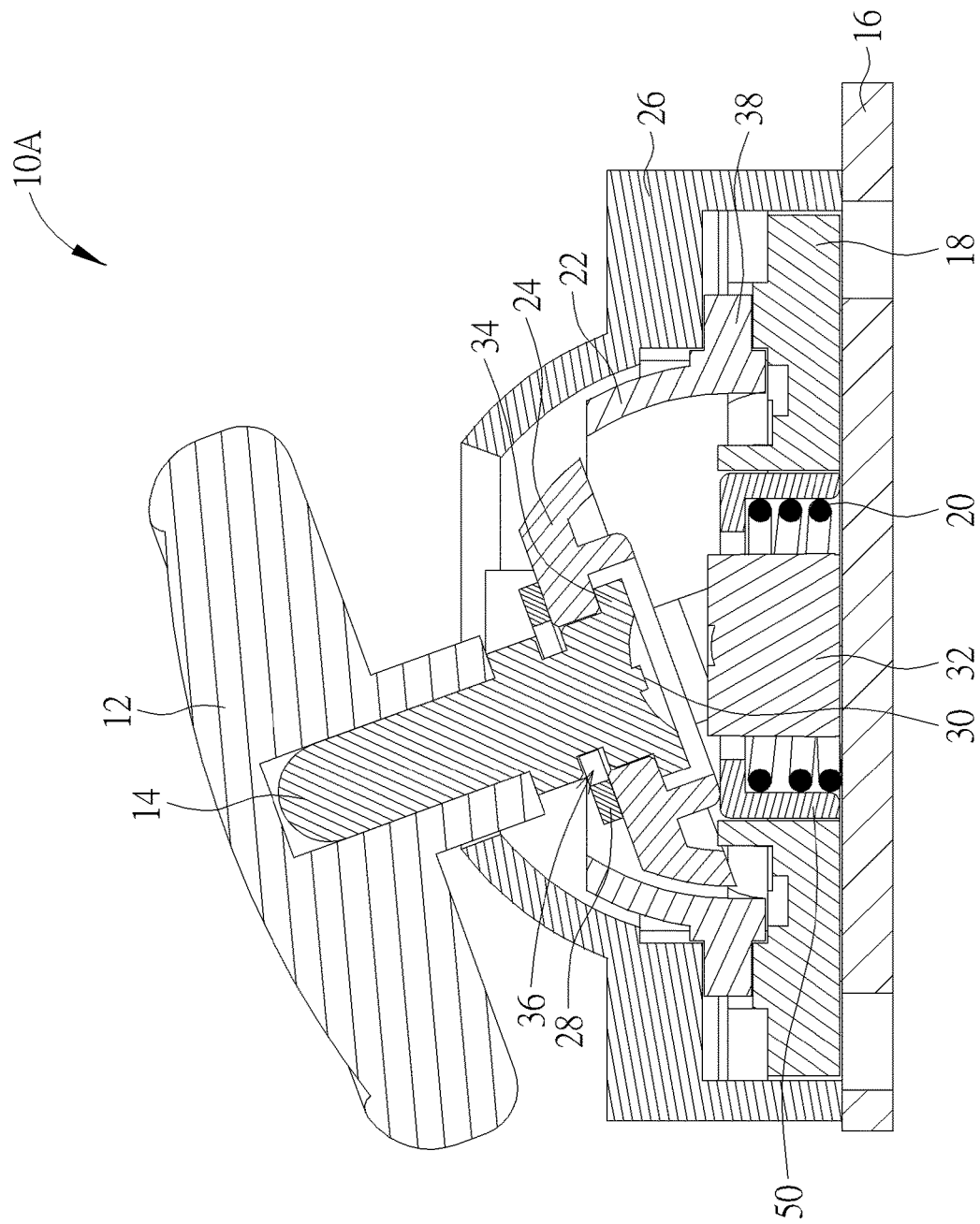

Please refer to FIG. 10 to FIG. 12. FIG. 11 and FIG. 12 are sectional views of the joystick 10A in other operation modes according to the second embodiment of the present invention. As shown in FIG. 10, the joystick 10A is in the initial mode and the resilient recovering component 20 is not compressed; the first rotation component 22 is not rotated relative to the bearing base 18, and the second rotation component 24 is not rotated relative to the first rotation component 22, so the actuating component 14 can be optionally revolved relative to the second rotation component 24, and the detection module 32 can detect the behavior of the identification feature 30 to decide the revolving angle of the joystick 10A. As shown in FIG. 11, the stick head 12 is pressed and the resilient recovering component 20 is compressed accordingly; the constraining component 50 can be pushed by the actuating component 14 and the second rotation component 24 and moved downwardly, and the detection module 32 can detect the behavior of the identification feature 30 to decide the pressing depth of the joystick 10A.

When the pressure applied to the stick head 12 is weakened or removed, the resilient recovering force of the resilient recovering component 20 can push the constraining component 50 upwardly, and the second constraining portion 58 can stop moving in response to the second constraining portion 58 abutting against the top of the first constraining portion 56. As shown in FIG. 12, the stick head 12 is laterally pressed, and the actuating component 14 and the second rotation component 24 can be laterally slanted relative to the constraining component 50 within the first rotation component 22, or the actuating component 14 and assembly of the first rotation component 22 and the second rotation component 24 can be laterally slanted relative to the constraining component 50 within the bearing base 18; the resilient recovering component 20 can be compressed in accordance with the constraining component 50 being pressed, and the detection module 32 can detect the behavior of the identification feature 30 to decide the slanting direction and the slanting angle of the joystick 10A.

Figure 13:
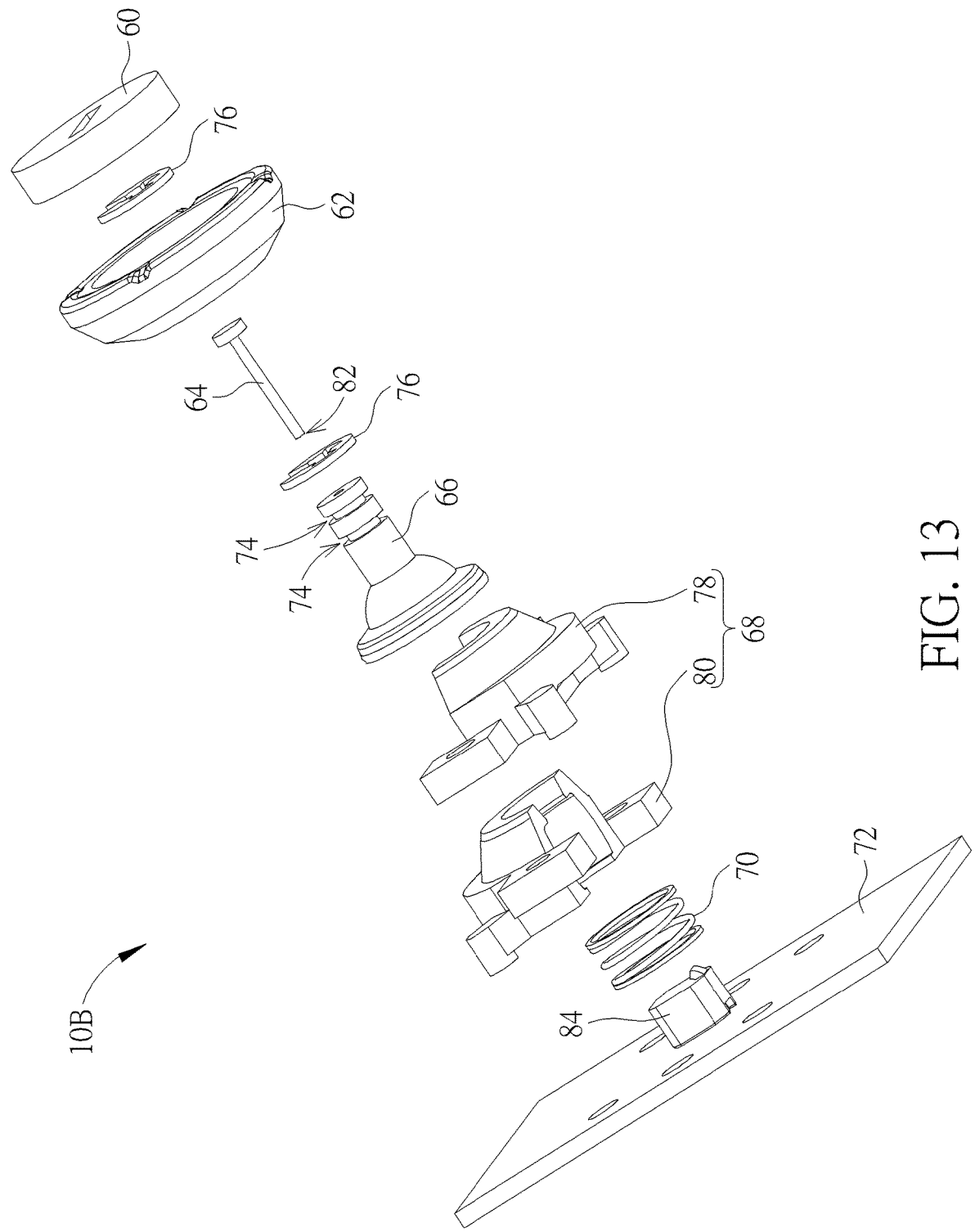
FIG. 13 is an exploded diagram of the joystick according to a third embodiment of the present invention.
Figure 14:
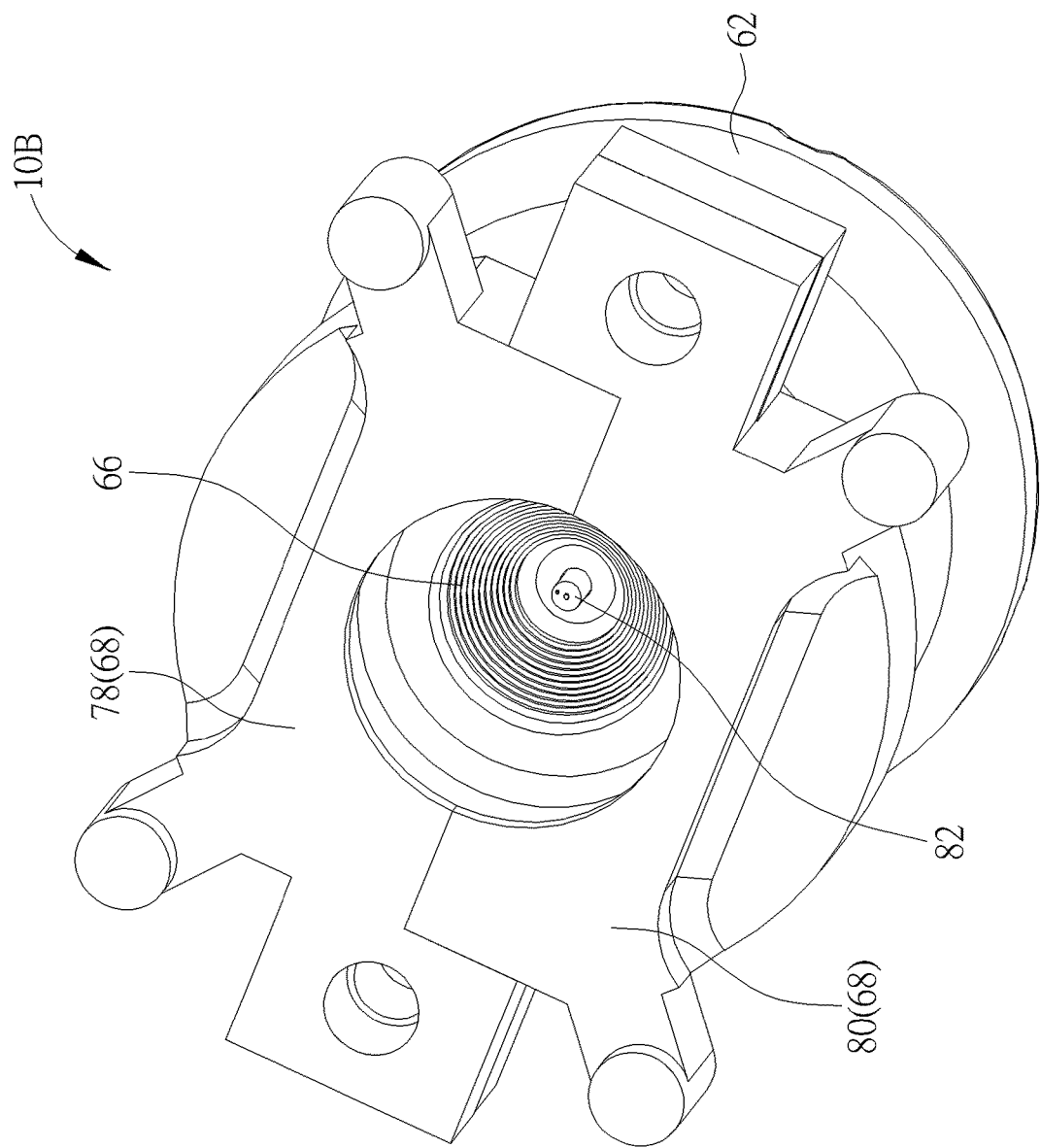
FIG. 14 is an assembly diagram of the joystick according to the third embodiment of the present invention.
Figure 15:
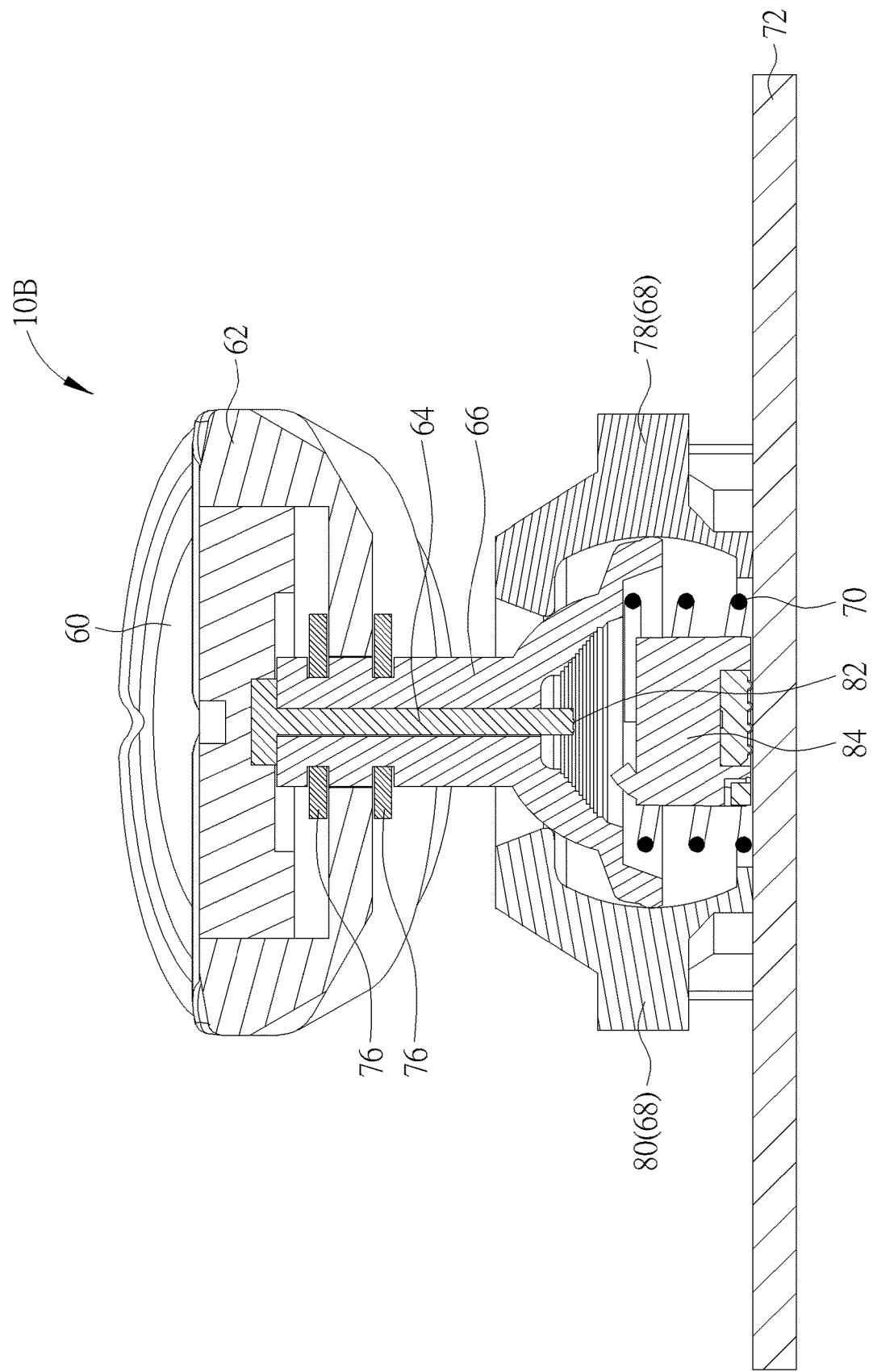
FIG. 15 is a sectional view of the joystick according to the third embodiment of the present invention.

Please refer to FIG. 13 to FIG. 15. FIG. 13 is an exploded diagram of the joystick 10B according to a third embodiment of the present invention. FIG. 14 is an assembly diagram of the joystick 10B according to the third embodiment of the present invention. FIG. 15 is a sectional view of the joystick 10B according to the third embodiment of the present invention. The joystick 10B can include a cover 60, a stick head 62, an actuating component 64, a sheathing component 66, a supporting component 68, a resilient recovering component 70 and a substrate 72. The actuating component 64 can have two engaging slots 74. The actuating component 64 passes through the stick head 62, and two fixing components 76 of the joystick 10B can be engaged with the engaging slots 74 and abut against two opposite surfaces of the stick head 62 respectively, so that the actuating component 64 can be tightly assembled with the stick head 62. The cover 60 can be disposed on the stick head 62 to shelter the top of the actuating component 64 and the fixing component 76 for preferred artistic appearance.

The supporting component 68 can include a first supporting portion 78 and a second supporting portion 80 assembled with each other. The sheathing component 66 can be covered by assembly of the first supporting portion 78 and the second supporting portion 80, and freely moved inside inner space of the supporting component 68 in multiple directions. The sheathing component 66 can contact against an inner wall of the supporting component 68 in the slidable manner. The resilient recovering component 70 can be disposed inside the supporting component 68. Two opposite ends of the resilient recovering component 70 can respectively abut against the sheathing component 66 and the substrate 72. An identification feature 82 can be disposed on a bottom of the actuating component 64. The bottom of the actuating component 64 can be stuck into the sheathing component 66 and located inside the sheathing component 66 and the supporting component 68. The substrate 72 can have a detection module 84. The optical detection signal emitted by the detection module 84 can enter the sheathing component 66 and the supporting component 68 and be projected onto the identification feature 82 of the actuating component 64. The detection module 84 can further receive the optical signal from the identification feature 82, and analyze the optical signal to detect the behavior of the identification feature 82 and decide the motion of the stick head 62.

Figure 16:
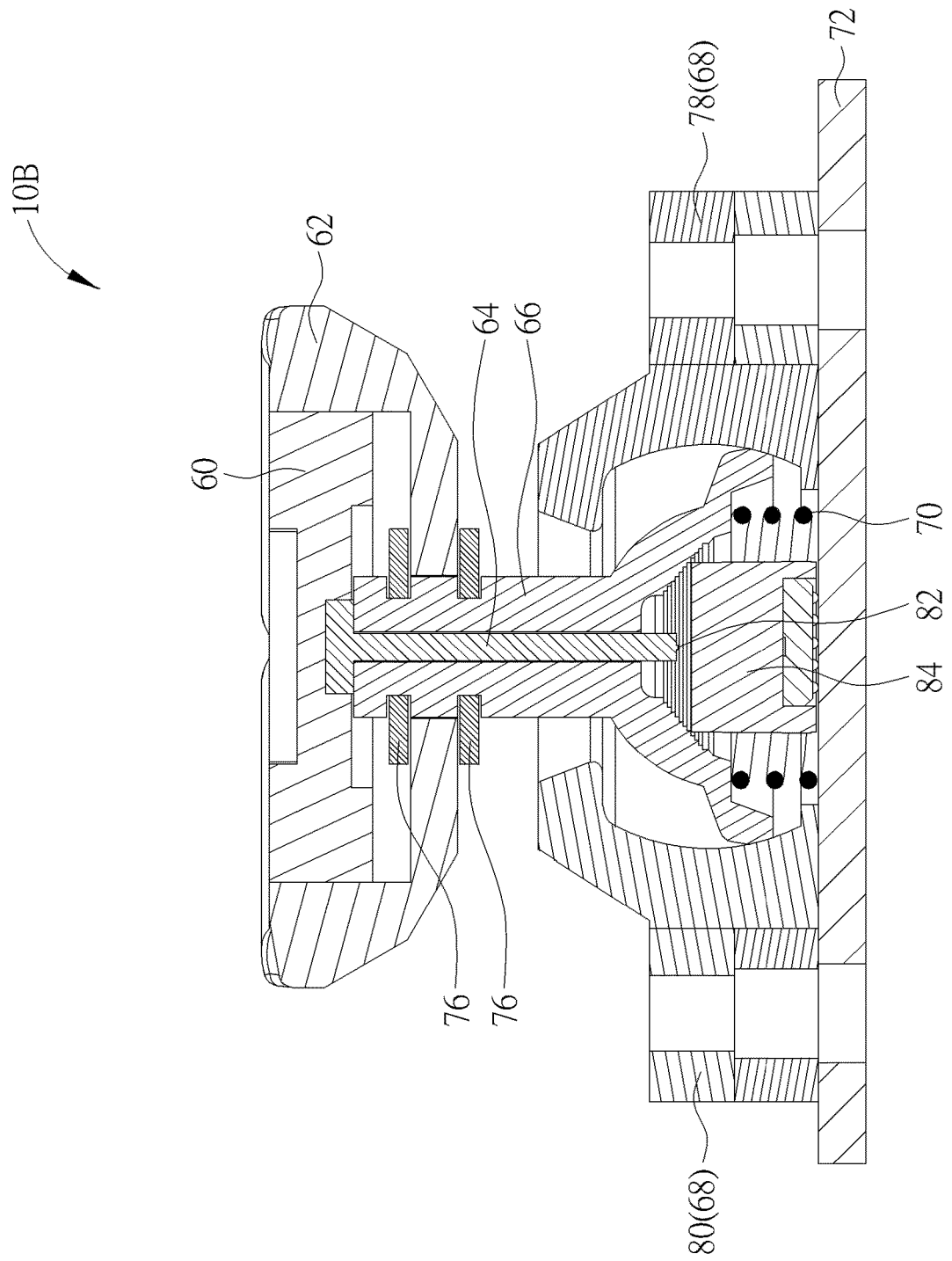
FIG. 16 and FIG. 17 are sectional views of the joystick in other operation modes according to the third embodiment of the present invention.
Figure 17:
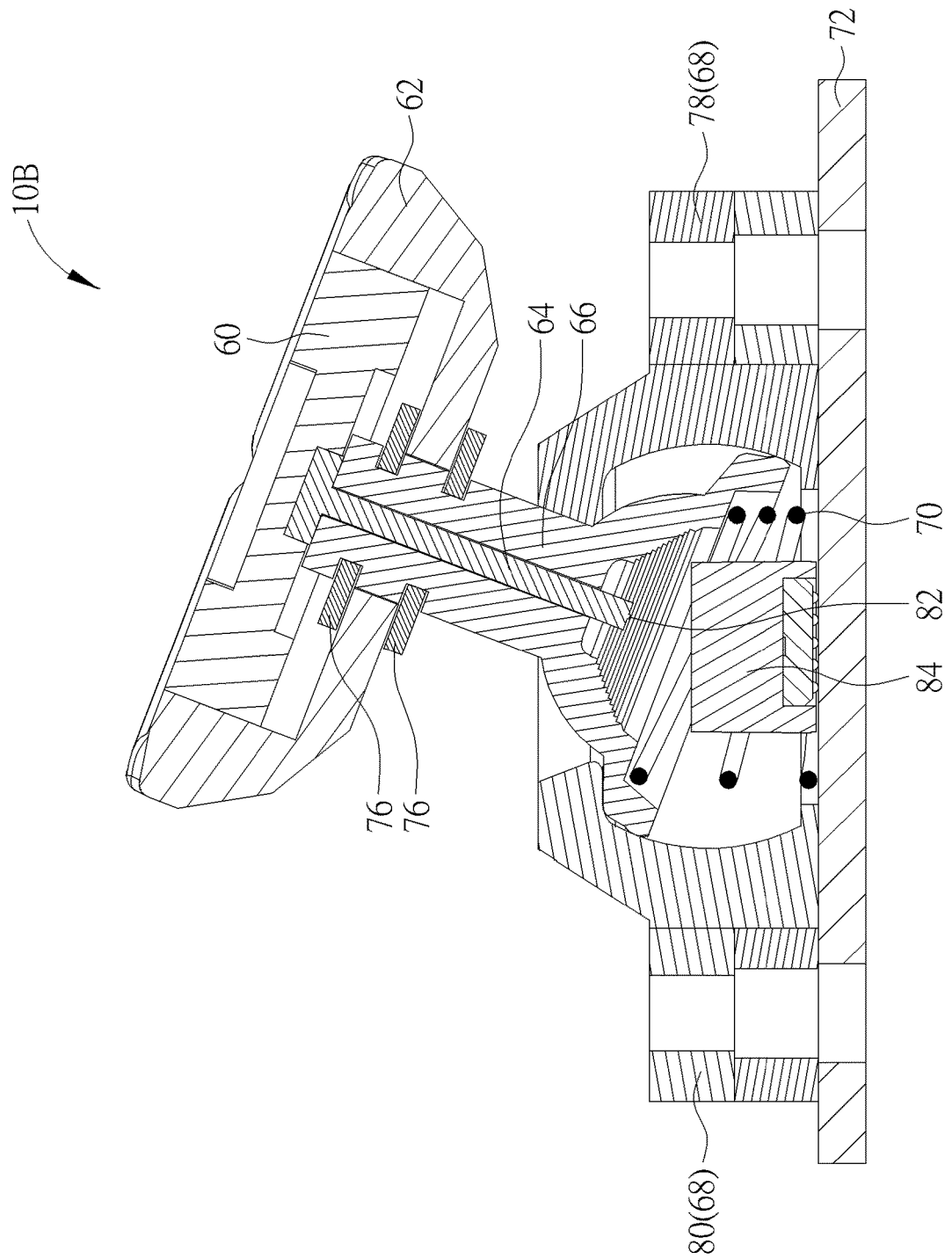

Please refer to FIG. 15 to FIG. 17. FIG. 16 and FIG. 17 are sectional views of the joystick 10B in other operation modes according to the third embodiment of the present invention. As shown in FIG. 15, the joystick 10B is in the initial mode and the resilient recovering component 70 is not compressed; the sheathing component 66 is upwardly pushed by the resilient recovering component 70 to abut against the supporting component 68, and the actuating component 64 can be optionally revolved inside the supporting component 68, so that the detection module 84 can detect the behavior of the identification feature 82 to decide the revolving angle of the joystick 10B. As shown in FIG. 16, the cover 60 and the stick head 62 are pressed, so the resilient recovering component 70 is compressed accordingly; the actuating component 64 and the sheathing component 66 can be moved downwardly by pressure of the stick head 62, and the detection module 84 can detect the behavior of the identification feature 82 to decide the pressing depth of the joystick 10B. If the pressure applied to the stick head 62 is weakened or removed, the resilient recovering force of the resilient recovering component 70 can upwardly push the sheathing component 66 until the sheathing component 66 abuts against the inner wall of the supporting component 68. As shown in FIG. 17, the cover 60 and the stick head 62 are laterally pressed; the stick head 62 can utilize the actuating component 64 to move the sheathing component 66 inside the supporting component 68 in the multiple directions, and the detection module 84 can detect the behavior of the identification feature 82 to decide the slanting direction and the slanting angle of the joystick 10B.

In conclusion, the joystick in the first embodiment can utilize assembly of the actuating component and the second rotation component to provide revolving movement, and further utilize pivots between the first rotation component and the second rotation component and pivots between the first rotation component and the bearing base to provide slanting movement. The joystick in the second embodiment can dispose the constraining component inside the bearing base; the constraining component can be moved downwardly with lowering motion of the second rotation component to compress the resilient recovering component, and the resilient recovering component can push the constraining component relative to the bearing base for recovering of the second rotation component and the stick head and the actuating component. The second embodiment can effectively achieve a stably recovering demand of the resilient recovering component via constraint of the constraining component and the bearing base, so that the joystick can have preferred detection accuracy. The joystick in the third embodiment can cover the sheathing component by the first supporting portion and the second supporting portion of the supporting component, and the sheathing component can be freely rotated or moved or slanted within the supporting component; the actuating component can be revolved via the sheathing component, and further can be operated as a universal joint by concentric assembly of the sheathing component and the supporting component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joystick, comprising:
a stick head;
an actuating component having a first end and a second end opposite to each other, the first end being connected to the stick head, an identification feature being disposed on the second end;
a substrate having a detector used to detect the identification feature and determine motion of the stick head;
a bearing base disposed on the substrate, an opening portion of the bearing base aligning with the detector and the actuating component, the bearing base comprises a first constraining portion connected with the opening portion to form a straight channel;
a resilient recovering component disposed between the substrate and the bearing base; and
a constrainer disposed around the resilient recovering component and movably disposed inside the opening portion in a fit manner, and used to abut against the actuating component in a detachable manner and further to slide inside the straight channel to constrain a straight moving direction of the constrainer, the constrainer comprising a second constraining portion cooperated with the first constraining portion, the first constraining portion and the second constraining portion respectively being a concave structure and a convex structure engaged in a slidably fit manner for linearly sliding the constrainer relative to the bearing base without rotation.

2. The joystick of claim 1, wherein the first constraining portion and the second constraining portion respectively are a slot and a slide block, the slide block is moved along a slotted direction of the slot to constrain a moving direction of the constrainer.

3. The joystick of claim 1, wherein the joystick further comprises a first rotation component and a second rotation component, the first rotation component is movably disposed on the bearing base and rotatable in a first direction, the second rotation component is movably connected to the first rotation component and rotatable in a second direction different from the first direction.

4. The joystick of claim 3, wherein the actuating component is disposed on the second rotation component in a rotatable manner.

5. The joystick of claim 3, wherein the actuating component abuts against the constrainer via the second rotation component in a detachable manner.

6. The joystick of claim 3, wherein an outer surface of the second rotation component is slid relative to an inner surface of the first rotation component in a detachable manner.

7. The joystick of claim 3, wherein the actuating component comprises an abutting portion abutting against a surface of the second rotation component, the joystick further comprises a fixer engaged with the actuating component and abutting against another surface of the second rotation component, so as to prevent the actuating component and the second rotation component from separation.

8. The joystick of claim 3, wherein the joystick further comprises a cover disposed on the substrate and used to cover the actuating component and the bearing base, the first end of the actuating component pierces through a hole portion of the cover and is connected with the stick head.

9. The joystick of claim 8, wherein an outer surface of the first rotation component is slid relative to an inner surface of the cover in a detachable manner.

* * * * *